United States Patent [19]

Gibson et al.

[11] 4,049,542

[45] Sept. 20, 1977

[54] REDUCTION OF SULFUR FROM HYDROCARBON FEED STOCK CONTAINING OLEFINIC COMPONENT

[75] Inventors: Kirk R. Gibson, El Cerrito; Thomas R. Hughes, Orinda; Robert L. Jacobson, Pinole, all of Calif.

[73] Assignee: Chevron Research Company, San Francisco, Calif.

[21] Appl. No.: 729,244

[22] Filed: Oct. 4, 1976

[51] Int. Cl.² ............................................. C10G 23/02
[52] U.S. Cl. .................................... 208/213; 208/216
[58] Field of Search ............................... 208/213, 216

[56] References Cited

U.S. PATENT DOCUMENTS

| | | | |
|---|---|---|---|
| 2,073,578 | 3/1937 | Gwynn | 208/213 |
| 2,500,146 | 3/1950 | Fleck et al. | 208/216 |
| 2,914,470 | 11/1959 | Johnson et al. | 208/216 |
| 2,959,627 | 11/1960 | Fleming et al. | 208/216 |
| 3,050,571 | 8/1962 | Fleming et al. | 208/216 |
| 3,108,947 | 10/1963 | Stijntjes | 208/216 |
| 3,265,615 | 8/1966 | Buss | 208/216 |

*Primary Examiner*—George Crasanakis
*Attorney, Agent, or Firm*—D. A. Newell; R. H. Davies; D. L. Hagmann

[57] ABSTRACT

A hydrocarbon feed containing an olefinic component and sulfur-containing impurities is upgraded in a sulfur removal process without hydrogenating the olefins by contacting a mixture of the feed and hydrogen gas with a catalyst comprising copper under conditions, including a temperature in the range of about 120° C to 400° C.

10 Claims, No Drawings

REDUCTION OF SULFUR FROM HYDROCARBON FEED STOCK CONTAINING OLEFINIC COMPONENT

BACKGROUND OF THE INVENTION

This invention relates to a hydrocarbon upgrading process. More particularly, it relates to a process for removing sulfur-containing impurities from a hydrocarbon feed which contains an olefinic component without materially hydrogenating the olefins.

Olefinic hydrocarbons are well known for their high chemical reactivity relative to suturated hydrocarbons. It is also known that olefinic hydrocarbon components in a gasoline or gasoline blend stock contribute to the octane numbers thereof. Sulfur-containing contaminants in a hydrocarbon, on the other hand, are undesirable and difficult to remove. In one method, the sulfur-contaminants are removed by contacting a mixture of the hydrocarbon and hydrogen gas with an effective hydrogenation catalyst, for example, a cobalt-molybdenum hydrodesulfurizing catalyst. In the method the sulfur is removed and olefinic components present therein are largely, if not completely, hydrogenated.

There is a need for a process in which sulfur-containing impurities in a hydrocarbon feedstock containing an olefinic component can be upgraded by selectively removing sulfur-containing impurities yet doing so with little or no hydrogenation of the olefins. An object herein is to fill this need.

SUMMARY OF THE INVENTION

A process is provided for reducing the combined sulfur content of a normally liquid hydrocarbon feedstock boiling below about 300° C and containing an olefinic component. In the process a mixture of the feedstock and hydrogen gas is contacted with a contact catalyst comprising copper. The contacting may be effected without materially hydrogenating the olefinic component by employing conditions, including
1. a hydrogen partial pressure in the range of from about 0.2 to about 20 atmospheres;
2. a temperature in the range of from about 120° C to 400° C; and
3. a liquid hourly space velocity in the range of from about 0.1 to about 15.

Catalysts comprising copper are known to be effective in saturating olefinic compounds in the absence of sulfur and in the presence of hydrogen. In the absence of hydrogen, materials comprising copper can remove highly reactive sulfur compounds from hydrocarbon feeds by sorption. Accordingly, it would be expected that in the presence of hydrogen and a copper-containing catalyst, any olefins in a hydrocarbon feedstock would be saturated, and that while any highly reactive sulfur compounds present should be removed by sorption, and less reactive sulfur compounds, such as thiophene, probably would not be removed. Surprisingly, at conditions within the above-specified ranges, both highly reactive and less reactive sulfur-containing impurities are effectively removed from a hydrocarbon mixture containing an olefinic component, and, even more surprisingly, this is accomplished without materially hydrogenating the olefinic component. Little (less than 10 mol percent) or none of the olefinic component is hydrogenated to saturated hydrocarbons.

EMBODIMENT

In a preferred embodiment, a gasoline blend stock obtained by catalytic cracking of a heavy naphtha petroleum fraction is used as the feedstock. A typical stock may contain about 38 ppmw of sulfur in the form of thiols, and 91 ppmw of sulfur in the form of sulfur-containing compounds such as organic sulfides, disulfides, thiophenes and the like sulfur-containing impurities normally present in a naphtha crackate. In addition, this stock may also contain at least as much as 40 mol percent of an olefinic component. The sulfur content of this stock is reduced to less than about 2 ppmw by contacting a mixture thereof and hydrogen gas with a fixed bed catalyst comprising copper and chromium and a porous alumina carrier having a surface area of about 200 square meters per gram and based upon the total catalyst about 14 weight percent of copper and 4 percent of chromium. The contacting conditions include:
1. a hydrogen partial pressure of about 1 atmosphere;
2. a total pressure of about 11 atmospheres;
3. a temperataure of about 200° C; and
4. a liquid hourly space velocity of about 1.0.

The F-1 clear octane number of the feedstock is about 95 and that of the product is about 93. Little, if any, of the olefinic component of the feedstock is hydrogenated in the contacting.

The Catalyst

Catalysts suitable for the contacting herein comprise copper metal and such are contemplated for use in the process. Preferably, the copper is in a composite with an inert (not reduced by hydrogen gas) carrier having a surface area of at least 10, more preferably at least 50, square meters per gram. Where the composite also includes a minor amount of chromium, the catalyst is especially advantageous.

The composites may be prepared by any suitable method. In a representative preparation, a porous alumina carrier is impregnated with an aqueous solution of a copper salt by the pore fill method followed by drying, calcining and reducing of the resulting copper oxide to metal using hydrogen gas in the usual way.

Representative inert carriers include metal oxides, such as alumina, silica-alumina, magnesia, and titania; and the like, that is, at least one refractory oxide of the metals of Groups II, III and IV of the Periodic Chart of the Elements and carbon. Alumina is preferred.

The amount of copper desirably present in a catalyst composite may vary widely. Satisfactory results are, in general, achieved when, based upon 100 parts by weight of the carrier component, the composite contains an amount of copper, in parts by weight, in the range of from about 0.5 to 40 parts of copper, preferably 5 to 20 parts. Where the composite also contains chromium, for each gram atom of copper, an amount of chromium in the range of from about 0.01 to 0.5 gram atoms, in general, is satisfactory.

The Feed

Normally liquid hydrocarbons boiling below about 300° C and containing (1) olefinic hydrocarbons and (2) combined sulfur-containing impurities are satisfactory feedstocks for the present process and are contemplated for use herein. A typical representative refinery feedstock has a content of olefins in the range of from about 5 to 75 mol percent and higher and a combined-sulfur content of from about 5 to 1500 ppmw of the impurities (calculated as elemental sulfur by weight) and higher.

Representative feedstocks include refined petroleum naphthas, coker naphthas, catalytic cracked product streams and fractions thereof, diesel oil, jet fuel, kerosene, cracked wax fractions, and the like hydrocarbon feedstocks containing an olefinic hydrocarbon component and combined-sulfur-containing impurities.

Process Conditions

The contacting of the feedstock and hydrogen with the contact catalyst may be carried out in any suitable manner with the hydrocarbon in the liquid or gaseous state or in mixtures thereof and with the contact catalyst in the fixed-bed, fluid-bed or slurry aspect. Satisfactory conditions of temperature, hydrogen partial pressure and liquid hourly space velocity will vary depending upon the feed and catalyst and, in general, these parameters will be in the ranges described above. Preferably, these ranges are as follows:

| Parameter | Preferred Range |
| --- | --- |
| Temperature, ° C | 160–220 |
| Hydrogen Pressure, Atm. | 0.2–20 |
| LHSV, V/V | 0.1–10 |

The catalyst herein is believed to be at least bifunctional in that in the process (1) it catalyzes sulfur removal from sulfur-containing hydrocarbon derivatives (contaminants) in the feedstock and (2) it absorbs resulting materials comprising sulfur. It becomes expended in use and, if desired, may be regenerated.

Regeneration

When the catalyst-adsorbent of the present invention becomes spent, for example, as demonstrated by the breakthrough and presence of sulfur-containing impurities in the resulting product mixture, it may be regenerated. Whether or not it is desirable to regenerate this material is a matter of economics and of the availability of materials required to manufacture a replacement. Where regeneration is to be the course followed, it is especially desirable that the regeneration be carried out in the following stages:

1. stripping adhering hydrocarbon from the contact mass;
2. subjecting the stripped material to oxidizing conditions in the presence of molecular oxygen;
3. subjecting the oxidized material to reducing conditions in the presence of molecular hydrogen gas; and
4. purging the reduced catalyst to remove the sulfur.

The following examples are submitted for the further demonstration, but not for the limitation of the invention.

EXAMPLE 1

In this example, the sulfur-contaminated feed (O.N. F-1 Clear, 93.9), a catalytically cracked olefinic light naphtha boiling in the range below 71° C (160° F) and containing about 50 mol percent of olefins, was contacted with copper and chromium supported upon alumina. This feed had a total sulfur content of 129 ppm of which 38 ppm was thiol sulfur (RSH) and the balance comprised organic sulfide and thiophene compounds. The catalystcontained about 14 weight percent of copper and 4% of chromium and had a surface area above 150 square meters per gram. The contacting of the feed with the catalyst was carried out under the following conditions:

Temp, ° C: 260°
Total Pressure, Atm. (1): 11.2
LHSV: 1.0

((1) Reactor pressured with N₂ gas to give this total pressure.)

The sulfur content of the effluent product stream with time was as follows:

| | Sulfur Content, ppm | |
| --- | --- | --- |
| Reaction, Hrs. | RSH | Other |
| 20 | 0 | 70 |
| 40 | 0 | 86 |
| 60 | 0 | 86 |

EXAMPLE 2

Example 1 was repeated except that hydrogen gas was included in the process feed stream (F-1 Clear O.N. of 93.3) at a ratio of 100 SCF of hydrogen per barrel of feed (i.e. a hydrogen partial pressure of about 1 atmosphere) and the total sulfur content was 110 ppm (30 ppm RSH and 80 ppm other). The sulfur content of the effluent product stream and the octane number with time were as follows:

| | Sulfur Content, ppm | | |
| --- | --- | --- | --- |
| Reaction time, Hrs. | RSH | Other | Octone No. |
| 6 | 0 | 0 | — |
| 18 | 0 | 0 | 93.1 |
| 30 | 0 | 0 | 93.8 |
| 42 | 0 | 24 | 94.3 |
| 54 | 0 | 46 | — |
| 66 | 0 | 54 | — |
| 90 | 0 | 63 | — |

From a comparison of Examples 1 and 2, it is clear that the addition of hydrogen gas to the process feed results in the effective removal of sulfur impurity from the feed over an extended reaction time.

EXAMPLE 3

Example 2 was repeated except that the temperature used was 204° C (400° F), the hydrogen to feed ratio was 200 SCF/BBL (about 2 atmospheres hydrogen partial pressure), and the feed had a total sulfur content of 110 ppm (30 ppm RSH and 80 ppm RSR, thiophenes, etc.). The effluent product stream was essentially free of all sulfur as before up to about the 40 hour onstream time. At 45 hours, this stream contained no thiol sulfur and 16 ppm of organic sulfide plus thiophene-type sulfur. At 60 hours the sulfur content was 0 and 46 ppm of RSH and of the other sulfur types, respectively.

EXAMPLE 4

Example 3 was repeated except that the catalyst was copper (14 weight percent) disposed upon alumina, i.e., contained no chromium. An essentially sulfur-free product stream was obtained up to an onstream time of about 22 hours. Thereafter at 30, 42 and 54 hours onstream the sulfur contents were 26, 58 and 70 ppm, respectively, none of which was thiol sulfur.

The above examples demonstrate that the presence of hydrogen gas at pressures as described above at the contacting of a sulfur-containing hydrocarbon feed as herein with a catalyst-adsorbent comprising copper, and especially where the catalyst-adsorbent comprises copper and chromium, results in a substantial improvement in the product stream in terms of a markedly reduced sulfur content thereof for a useful onstream time.

What is claimed is:

1. A process for reducing the combined-sulfur content of a normally liquid hydrocarbon feedstock boiling below about 300° C and containing an olefinic hydrocarbon component, comprising contacting a mixture of said feedstock and hydrogen gas with a catalyst comprising copper metal, said contacting being effected without materially hydrogenating said olefinic component and under conditions including:
   a. a hydrogen partial pressure in the range of from about 0.2 to about 20 atmospheres;
   b. a temperature in the range of from about 120° C to 400° C; and
   c. at a liquid hourly space velocity in the range of from about 0.1 to 15.

2. A process as in claim 1 further characterized in that (1) said feedstock is a naphtha petroleum fraction containing about 40 mol percent of olefins; (2) said catalyst is a composite of porous alumina, copper metal, and chromium metal, said alumina having a surface area of about 200 square meters per gram; and (3) said contacting conditions include:
   i. a hydrogen partial pressure of about 1 atmosphere;
   ii. a total pressure of about 11 atmospheres;
   iii. a temperature of about 200° C; and
   iv. a liquid hourly space velocity of about 1.

3. A process as in claim 1 further characterized in that said catalyst comprises a composite of copper metal and an inert carrier selected from the group consisting of alumina, silica-alumina, magnesia and titania having a surface area of at least about 10 square meters per gram.

4. A process as in claim 3 further characterized in that sid catalyst comprises copper metal and chromium metal on porous alumina.

5. A process as in claim 3 further characterized in that said carrier has a surface area of at least 50 square meters per gram.

6. A process as in claim 5 further characterized in that said composite contains an amount of copper metal, in parts by weight, in the range of from about 0.5 to about 40 parts per 100 parts of said carrier.

7. A process as in claim 6 further characterized in that for each gram atom of copper metal, said composite contains an amount of chromium metal in the range of from about 0.01 to 0.5 gram atoms.

8. A process as in claim 1 further characterized in that
   1. said temperature is in the range of from about 160° to 220° C;
   2. said hydrogen pressure is in the range of from about 0.2 to 20 atmospheres; and
   3. said liquid hourly space velocity is in the range of from about 0.1 to 10.

9. A process as in claim 1 further characterized in that said feedstock has a combined-sulfur content, calculated as elemental sulfur, in the range of from about 5 to 1500 ppmw.

10. A process as in claim 1 further characterized in that said catalyst is expended in use and thereafter regenerated for further use.

* * * * *